United States Patent
Kuroda

(10) Patent No.: US 8,411,640 B2
(45) Date of Patent: Apr. 2, 2013

(54) COMMUNICATION APPARATUS

(75) Inventor: Masaru Kuroda, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 730 days.

(21) Appl. No.: 12/475,942

(22) Filed: Jun. 1, 2009

(65) Prior Publication Data
US 2010/0008285 A1 Jan. 14, 2010

(30) Foreign Application Priority Data
Jul. 10, 2008 (JP) .................................. 2008-180059

(51) Int. Cl.
*H04W 4/00* (2009.01)
(52) U.S. Cl. ........................................ 370/331; 455/436
(58) Field of Classification Search .................... None
See application file for complete search history.

(56) References Cited

U.S. PATENT DOCUMENTS

| | | | | |
|---|---|---|---|---|
| 5,959,546 | A * | 9/1999 | Dorenbosch | 340/7.27 |
| 7,149,521 | B2 * | 12/2006 | Sundar et al. | 455/435.1 |
| 7,447,176 | B2 * | 11/2008 | Ruan et al. | 370/331 |
| 8,054,798 | B2 * | 11/2011 | Jeong et al. | 370/331 |
| 2004/0039817 | A1 * | 2/2004 | Lee et al. | 709/225 |
| 2005/0030924 | A1 | 2/2005 | Yano et al. | |
| 2006/0062183 | A1 | 3/2006 | Forte et al. | |
| 2006/0068751 | A1 | 3/2006 | Chandra et al. | |
| 2006/0285528 | A1 * | 12/2006 | Gao et al. | 370/338 |
| 2007/0060067 | A1 * | 3/2007 | Ruuska | 455/67.11 |
| 2007/0140163 | A1 * | 6/2007 | Meier et al. | 370/329 |
| 2007/0184832 | A1 * | 8/2007 | Faccin et al. | 455/432.1 |
| 2007/0189249 | A1 * | 8/2007 | Gurevich et al. | 370/338 |
| 2007/0249291 | A1 * | 10/2007 | Nanda et al. | 455/73 |
| 2008/0076423 | A1 | 3/2008 | Lee et al. | |

FOREIGN PATENT DOCUMENTS

| | | |
|---|---|---|
| JP | 8-191305 | 7/1996 |
| JP | 2001-352569 | 12/2001 |
| JP | 2005-347887 | 12/2005 |
| JP | 2006-157388 | 6/2006 |
| JP | 2007-166412 | 6/2007 |
| JP | 2007-251652 | 9/2007 |
| JP | 2008-79306 | 4/2008 |

OTHER PUBLICATIONS

Office Action issued Mar. 21, 2012 in Japan Application No. 2008-180059.
Taiwanese Office Action with English translation mailed Aug. 23, 2012, in Taiwanese Patent Application No. 098122608.

* cited by examiner

*Primary Examiner* — Hassan Kizou
*Assistant Examiner* — Robert A A Shand
(74) *Attorney, Agent, or Firm* — Oblon, Spivak, McClelland, Maier & Neustadt, L.L.P.

(57) ABSTRACT

A communication apparatus transmits a request message to connectable relay apparatuses, and receives a response message from the relay apparatuses. The communication apparatus determines whether the received request message includes the device identification data of a relay apparatus to which it is currently connected. If no received response message includes the device identification data of a relay apparatus to which it is currently connected, the communication apparatus requests another relay apparatus identified based on device identification data that is included in any of the received response messages to make a connection with the communication apparatus.

16 Claims, 14 Drawing Sheets

FIG. 3

| FRAME CONTROL | DURATION | DES. ADDRESS | SRC. ADDRESS | BSSID | SEQUENCE /FRAG | SSID | SUPPORTED RATES |

FIG. 4

| FRAME CONTROL | DURATION | DES. ADDRESS | SRC. ADDRESS | BSSID | SEQUENCE/ FRAG | TIME- STAMP | BEACON INTERVAL | CAPA- BILITY INFO. | SSID | SUP- PORTED RATES | DS PARA- METER | ... |

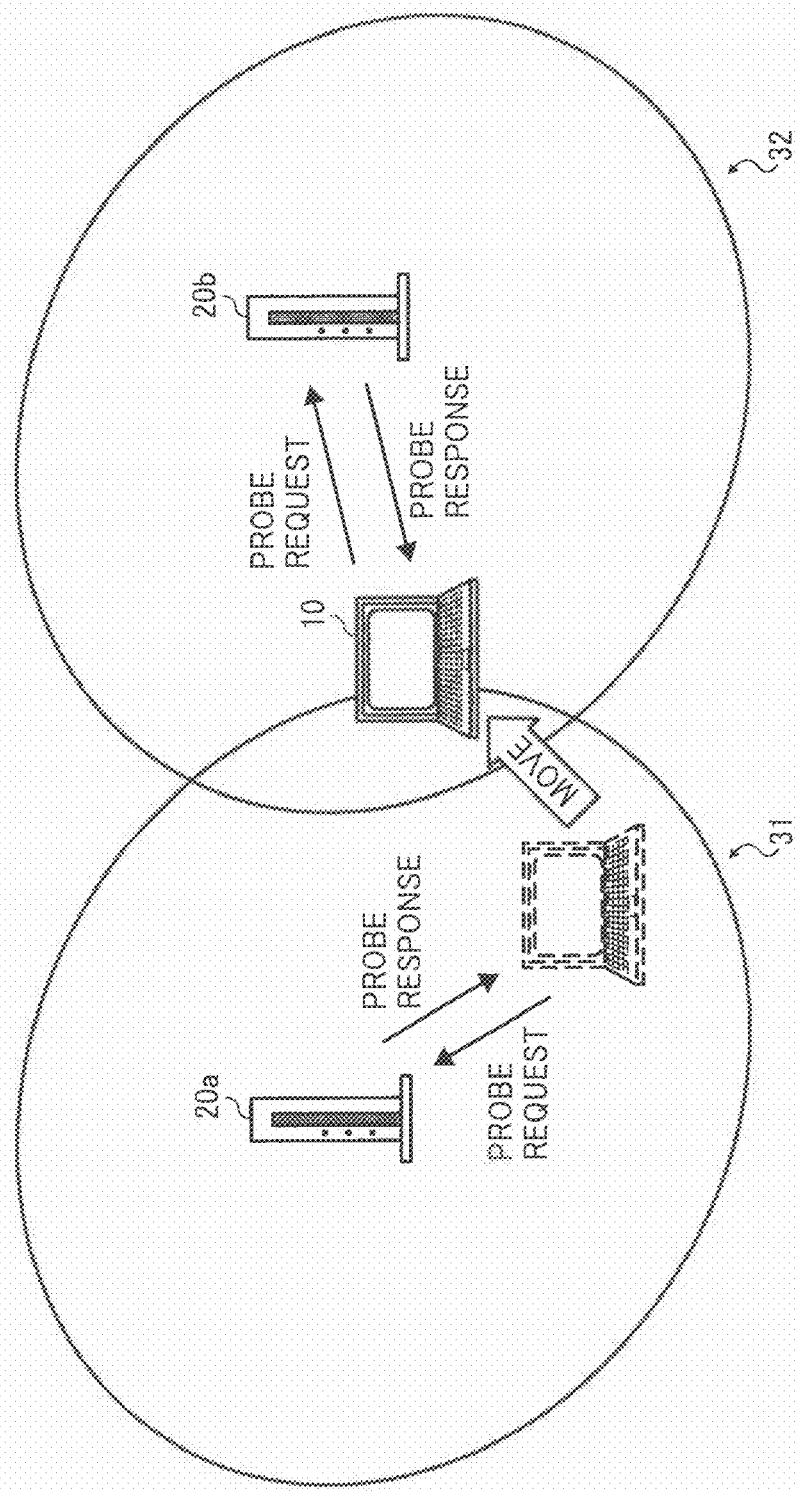

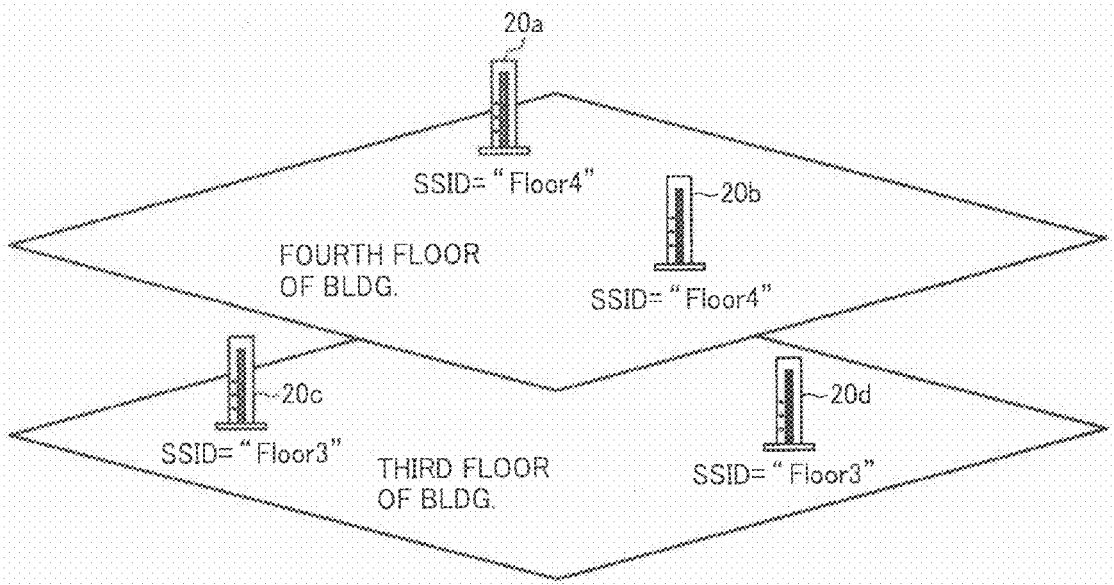
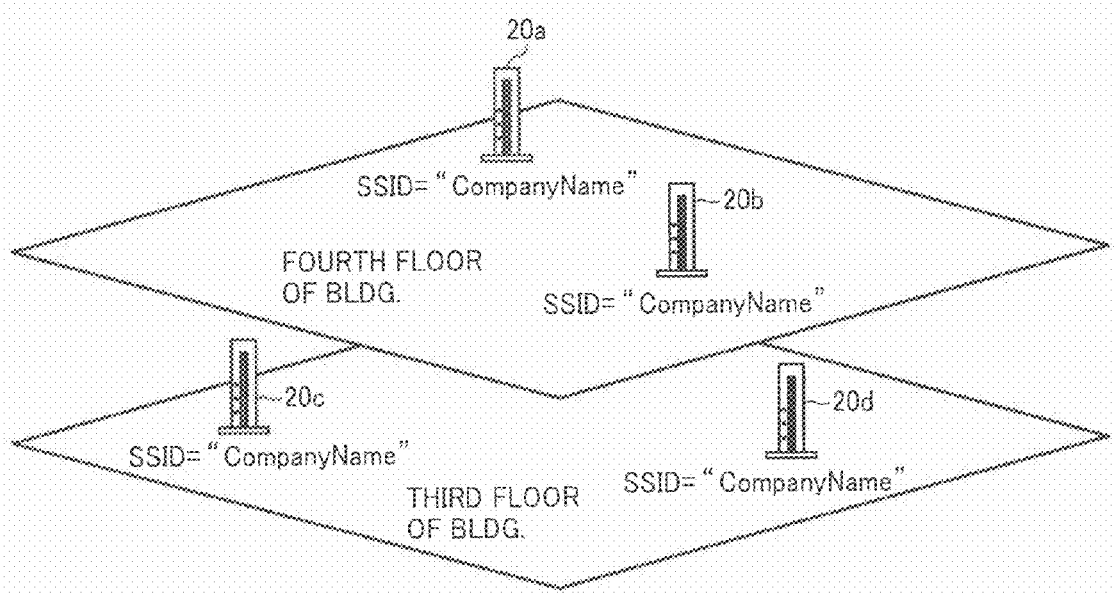

FIG. 9

| NAME OF AP | SSID | BSSID | SRC. ADDRESS | INCOMING SIGNAL INTENSITY | SUPPORTED RATES | ... |
|---|---|---|---|---|---|---|
| AP20a | "CompanyName" | xx:yy:zz:00:00:01 | xx:yy:zz:00:00:00 | 20 | | ... |
| AP20b | "CompanyName" | xx:yy:zz:00:00:11 | xx:yy:zz:00:00:11 | 25 | | ... |
| AP20c | "CompanyName" | xx:yy:zz:00:01:01 | xx:yy:zz:00:01:01 | 15 | | ... |
| ... | ... | | | | | |
| ... | ... | | | | | |

FIG. 10

| NAME OF AP | SSID | BSSID | SRC. ADDRESS | INCOMING SIGNAL INTENSITY | SUPPORTED RATES | ... |
|---|---|---|---|---|---|---|
| AP20a | "CompanyName" | xx:yy:zz:00:00:01 | xx:yy:zz:00:00:00 | 20 | | ... |

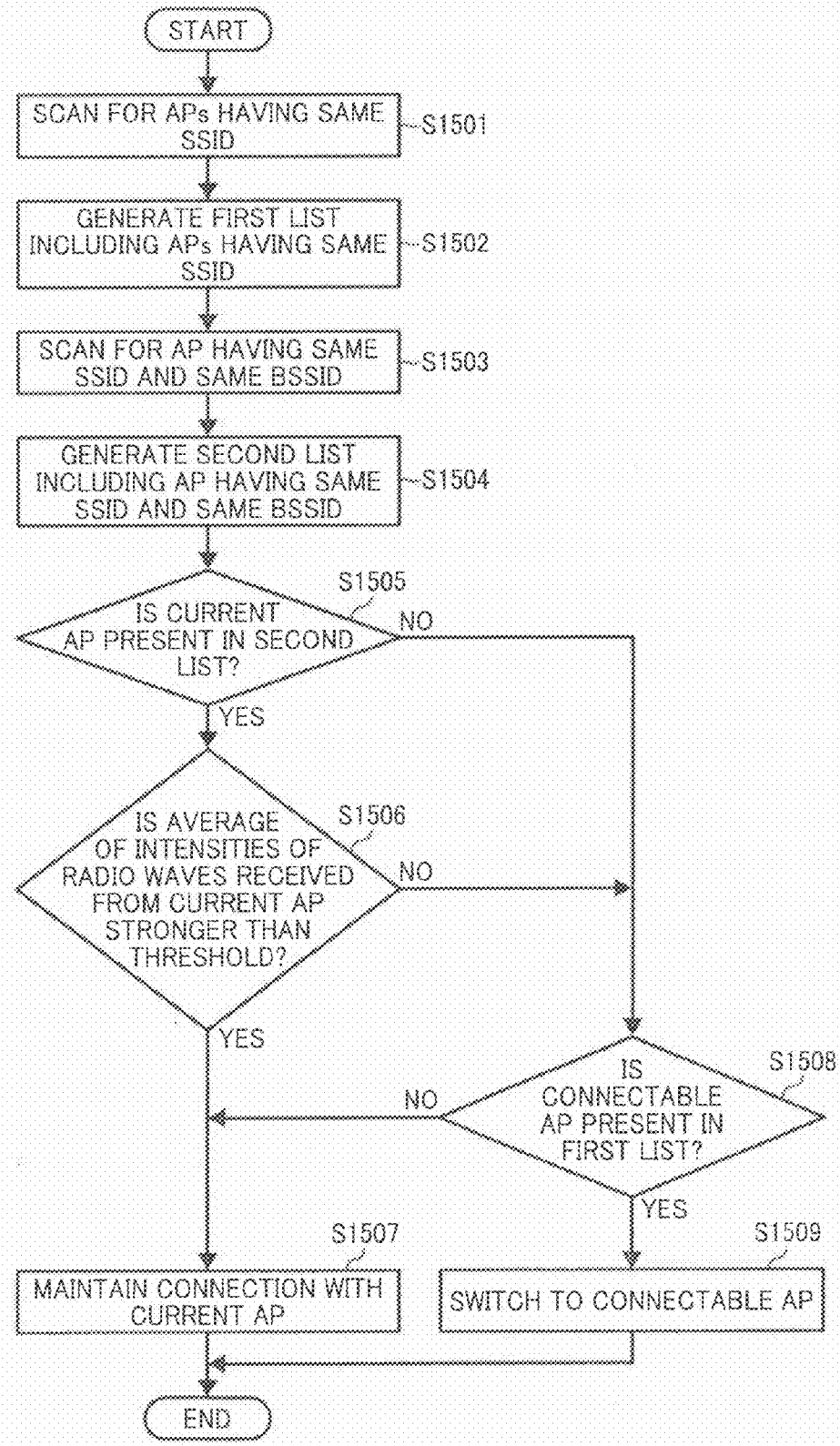

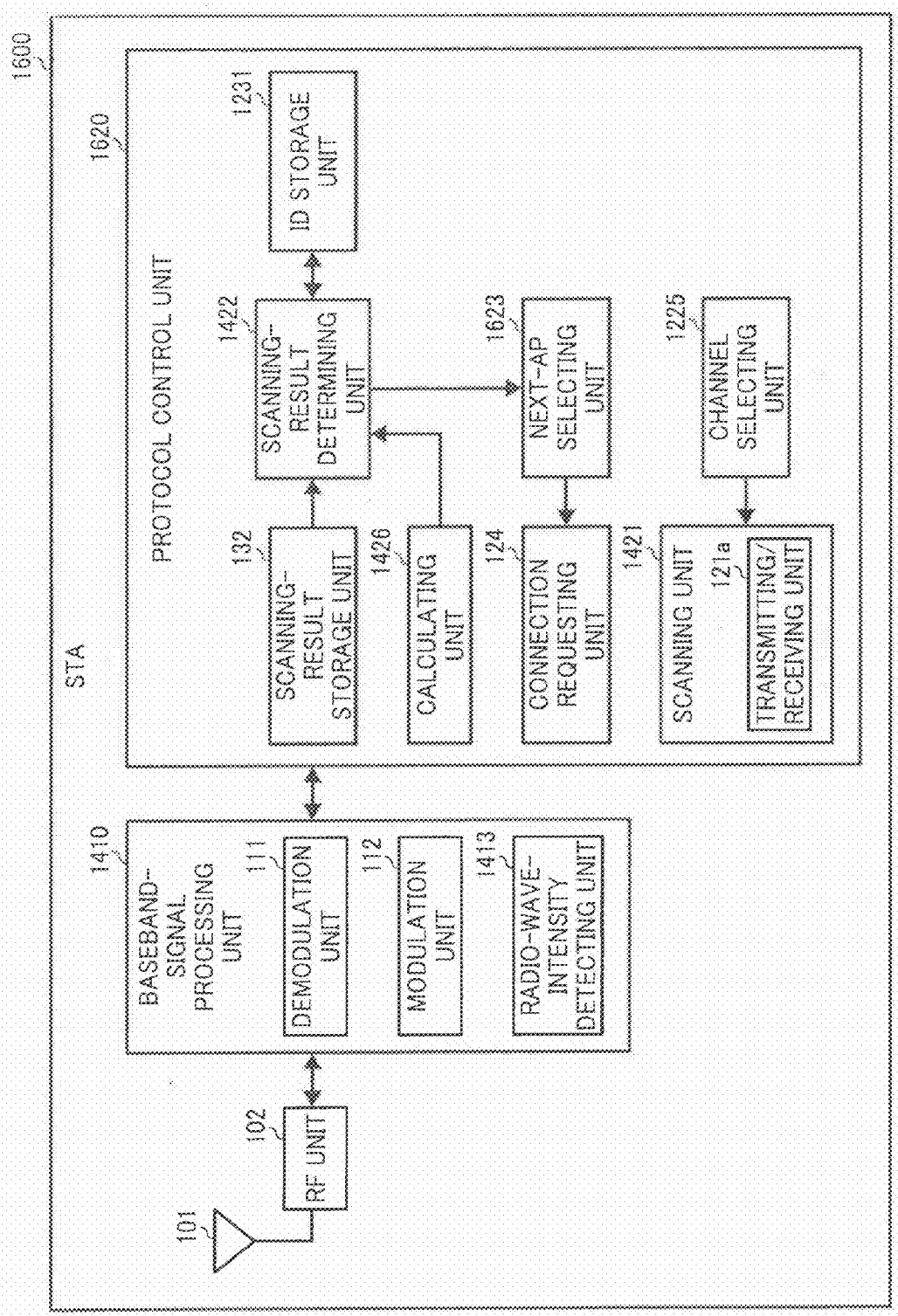

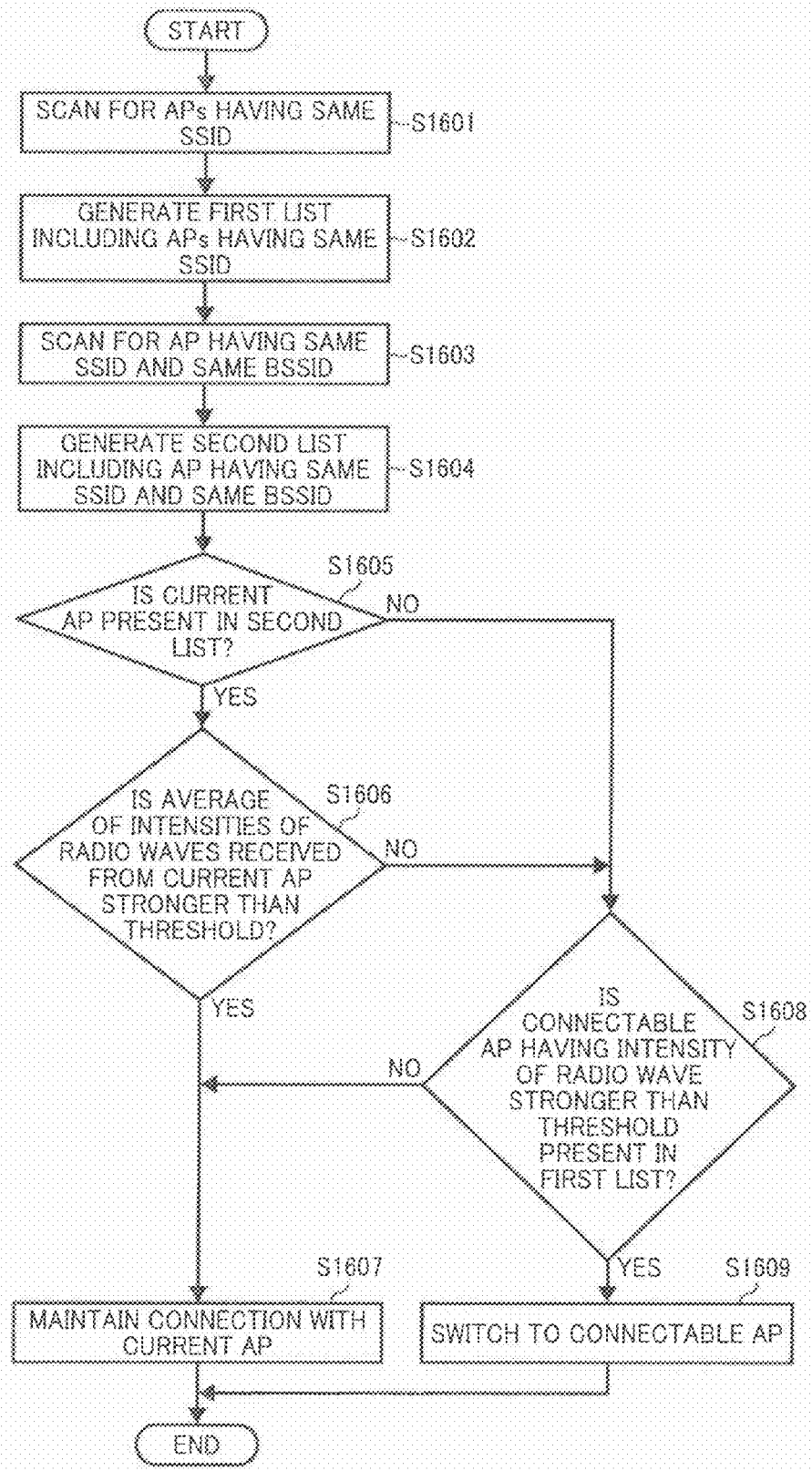

COMMUNICATION APPARATUS

CROSS-REFERENCE TO RELATED APPLICATIONS

The present application claims priority to and incorporates by reference the entire contents of Japanese priority document 2008-180059 filed in Japan on Jul. 10, 2008.

BACKGROUND OF THE INVENTION

1. Field of the Invention

The present invention relates to a communication apparatus that switches, by roaming, between access points that relay wireless communications.

2. Description of the Related Art

IEEE 802.11, which is a set of standards for a local area network (LAN), defines a mutual wireless communication system between a base station (access point (AP)) and a terminal station (station (STA)). The AP is a parent station having a physical management range. The AP manages a plurality of STAs connected to the AP, and thereby controls communications between the AP and the STAs.

Because a range of a radio wave emitted from the AP is confined, to not loose an STA, a plurality of APs are installed, in general, in such a manner their ranges of the radio waves (hereinafter, "coverage areas") overlap. With this configuration, a mobile personal computer (PC) that is transferring data, moving from a coverage area of an AP 1 to a coverage area of an AP 2 can maintain an on-line state by roaming, i.e., switching from the AP 1 to the AP 2.

Each of the APs is allocated with identification data called "service set identifier (SSID)". The SSID is used by an STA to identify a wireless communications network to which it can be connected. A group of APs can be allocated with the same SSID. If, for example, a network on the third floor of a certain building has an SSID "Floor3", then the SSID "Floor3" is allocated to all of the APs installed on the third floor.

If the SSIDs are decided on a floor-to-floor basis as in the above example, as long as the STA moves within the floor, the on-line state is maintained by the roaming operation without problems. However, the roaming operation cannot be performed when the STA moves to another floor because the SSIDs are different for the two floors. Therefore, when the STA moves to another floor, the on-line state is disconnected. To reestablish the on-line state, the STA performs a re-connection process by identifying the SSID of the floor to which the STA has moved. This situation is undesirable because data cannot be transferred during the re-connection process.

To avoid the above-described undesirable situation, one approach is to allocate a single SSID to all the APs in a building. Usage of the single SSID makes it possible to maintain the on-line state even when an STA moves from one floor to another.

A typical method of the roaming is described below. To periodically scan for connectable APs, an STA transmits a request message (hereinafter, "probe request frame") during the data transmission. Upon receiving the probe request frame, each of the connectable APs returns a response message (hereinafter, "probe response frame") to the STA. The STA decides, based on the probe response frame, one of the APs as a target AP to which the STA switches by the roaming (hereinafter, "next AP").

If two or more connectable APs exist simultaneously, in a technology disclosed in Japanese Patent Application Laid-open No. 2001-352569, the connectable AP that returns the probe response frame with the strongest radio wave is selected as the next AP. More particularly, the STA determines whether the SSID extracted from the received probe response frames is the same. If the SSIDs are the same, the STA connects itself to an AP having the stronger radio wave. For example, if the STA determines, while it is currently connected to the AP 1, that the radio wave received from the AP 2 is stronger than the radio wave received from the AP 1, the STA switches from the AP 1 to the AP 2. On the other hand, if the STA determines that the radio wave received from the AP 1 is stronger than the radio wave received from the AP 2, the STA maintains the connection with the AP 1.

However, selection of the next AP based on the intensity of the radio wave can cause frequent switches, which may disadvantageously result in a loss of the data transmission time.

Assume, for example, that the single SSID is used on every floor of the building, and the STA is installed by a window on the third floor. The STA may receive the radio wave coming from another floor. In general, the intensity of such a radio wave coming through outside of the building is unstable because of various external factors such as multipath, reflection, and phasing. If the STA switches between the APs in comparison with the intensities of the radio waves only, the STA may frequently switch between the AP on the third floor and the AP on another floor. Although shorter than the stop period required by the re-connection process, the roaming operation stops the data transmission for a while.

SUMMARY OF THE INVENTION

It is an object of the present invention to at least partially solve the problems in the conventional technology.

According to an aspect of the present invention, there is provided a communication apparatus capable of connecting to one of a plurality of relay apparatuses that relays wireless communications. The communication apparatus includes an identification-data storage unit that stores therein first device identification data for identifying a first relay apparatus to which the communication apparatus is currently being connected, the first device identification data being unique to the first relay apparatus; a transmitting unit that transmits a request message that requests connectable relay apparatuses to return a response message; a receiving unit that receives response messages from the connectable relay apparatuses, each of the response message including individual device identification data of the relay apparatus that transmitted the request message; a determining unit that determines whether received request message includes the individual device identification data that matches with the first device identification data stored in the identification-data storage unit; and a connection requesting unit that requests, if no received response message includes the individual device identification data that matches with the first device identification data stored in the identification-data storage unit, a second relay apparatus from among the relay apparatuses identified by second device identification data that is included in any of the received response messages to make a connection with the communication apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram for explaining a data structure of a probe request frame;

FIG. 4 is a schematic diagram for explaining a data structure of a probe response frame;

FIG. 5 is a schematic diagram of a situation where an STA moves to another coverage area;

FIG. 6 is a schematic diagram of a first management system in which different SSIDs are allocated on a floor-to-floor basis;

FIG. 7 is a schematic diagram of a second management system in which a single SSID is allocated to all APs in a building;

FIG. 9 is a schematic diagram for explaining a data structure of a first list stored in a scanning-result storage unit;

FIG. 10 is a schematic diagram for explaining a data structure of a second list stored in the scanning-result storage unit;

FIG. 15 is a general flowchart of a roaming process according to the third embodiment;

FIG. 16 is a block diagram of an STA according to a fifth modification of the third embodiment; and FIG. 17 is a general flowchart of a roaming process according to the fifth modification.

DETAILED DESCRIPTION OF THE PREFERRED EMBODIMENTS

Exemplary embodiments of the present invention are described in detail below with reference to the accompanying drawings.

As described above, the conventional method of switching between the APs by the determination that is made based on only a comparison between the intensities of the radio waves can cause a loss of the data transmission time due to frequent switches. Moreover, the conventional method of selecting the AP having the same SSID, i.e., same as the STA, as the next AP makes the conventional method vulnerable to spoofing. Suppose that a spoofed AP emitting a strong radio wave comes closer to an STA that is located near a window of a building from outside. In the conventional method, the STA, which determines the next AP only by the intensity of the radio wave, will switch to the spoofed AP carelessly, as a result of which data is leaked out. This is a serious security problem.

To solve the problems, a method has been disclosed of exchanging IDs between the AP and the STA after the connection is established, and maintaining the connection while making an access check by the AP. However, in this method, software for managing the STA must be installed in the all the APs. Therefore, some of currently operating APs (especially, old-type APs that are not manufactured anymore or for which maintenance is not available anymore) are not suitable.

In contrast, a communication apparatus according to a first embodiment of the present invention transmits a probe request frame, and scans for connectable APs by probe response frames that are received as responses to the probe request frame. If the current AP is included in the connectable APs, the communication apparatus maintains the connection regardless of whether the intensity of the radio wave received from the current AP is the strongest. If the current AP is not included in the connectable APs, the communication apparatus switches to one of the connectable APs by roaming. In this manner, the maintaining of the connection between the STA and the current AP and the switching to another AP are implemented without measurements to be taken by the APs with a level of security or a level of user-friendliness not decreased.

Figure 1:
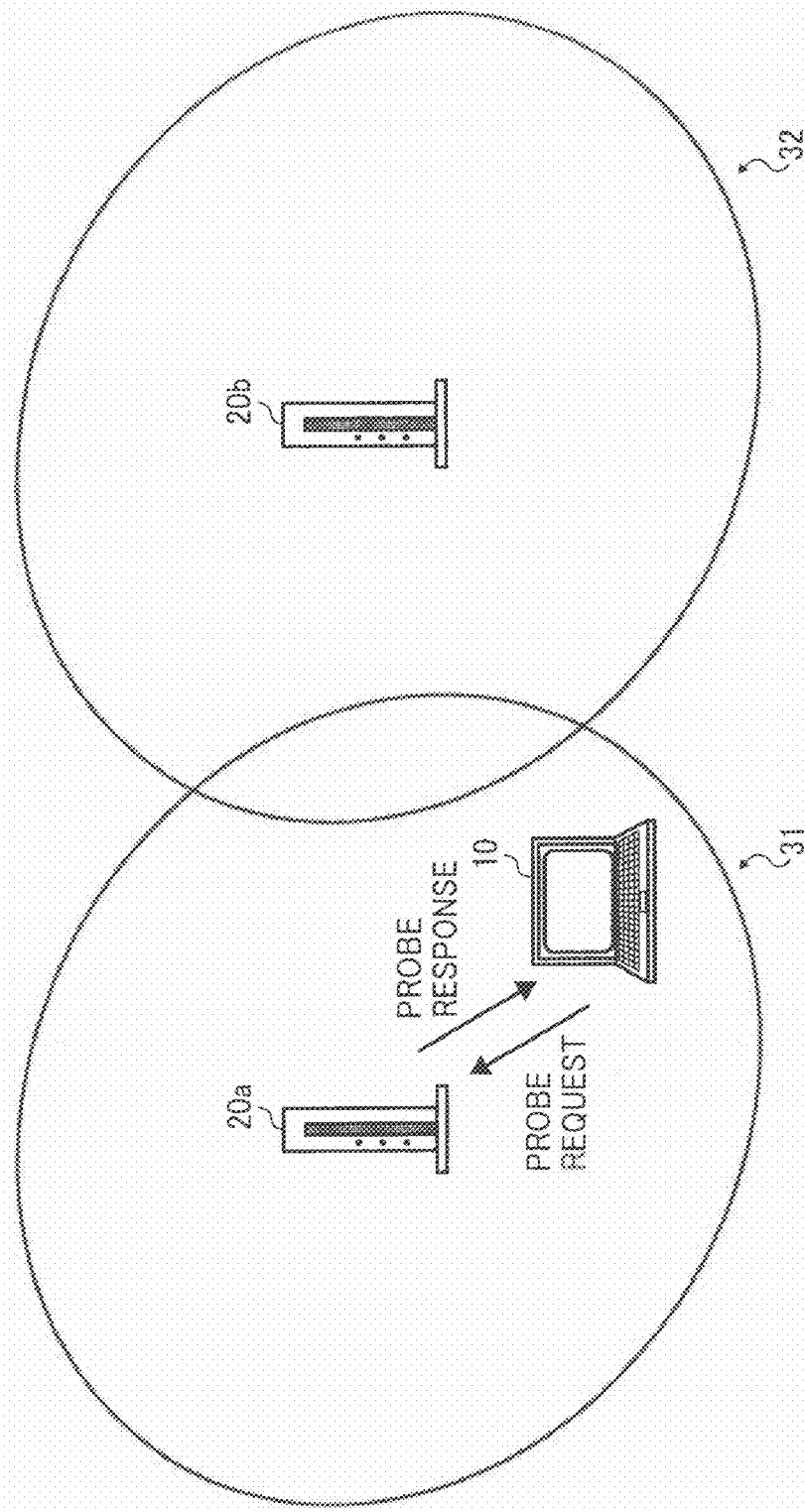
FIG. 1 is a schematic diagram of a communication system according to a first embodiment of the present invention.

A configuration of a communication system including an STA 10 as the communication apparatus according to the first embodiment and a plurality of APs 20 (20a, 20b) as relay apparatuses that relay wireless communications is described below with reference to FIG. 1. FIG. 1 is a schematic diagram of the communication system according to the first embodiment.

The STA 10 is a terminal station conforming to the IEEE 802.11. The STA 10 is, for example, a portable laptop PC. A configuration of the STA 10 will be described later.

The APs 20a and 20b are base stations on a wireless LAN, conforming to the IEEE 802.11. A coverage area 31 is a range within which a radio wave emitted from the AP 20a reaches. A coverage area 32 is a range of the AP 20b. The APs 20a and 20b have the same configuration, and therefore an arbitrary one of the APs 20a and 20b will be referred to as an "AP 20".

The STA 10 is within the coverage area 31 of the AP 20a as shown in FIG. 1. Therefore, the STA 10 transmits a probe request frame to the AP 20a and receives a probe response frame from the AP 20a, and thereby establishes the connection with the AP 20a.

Figure 2:
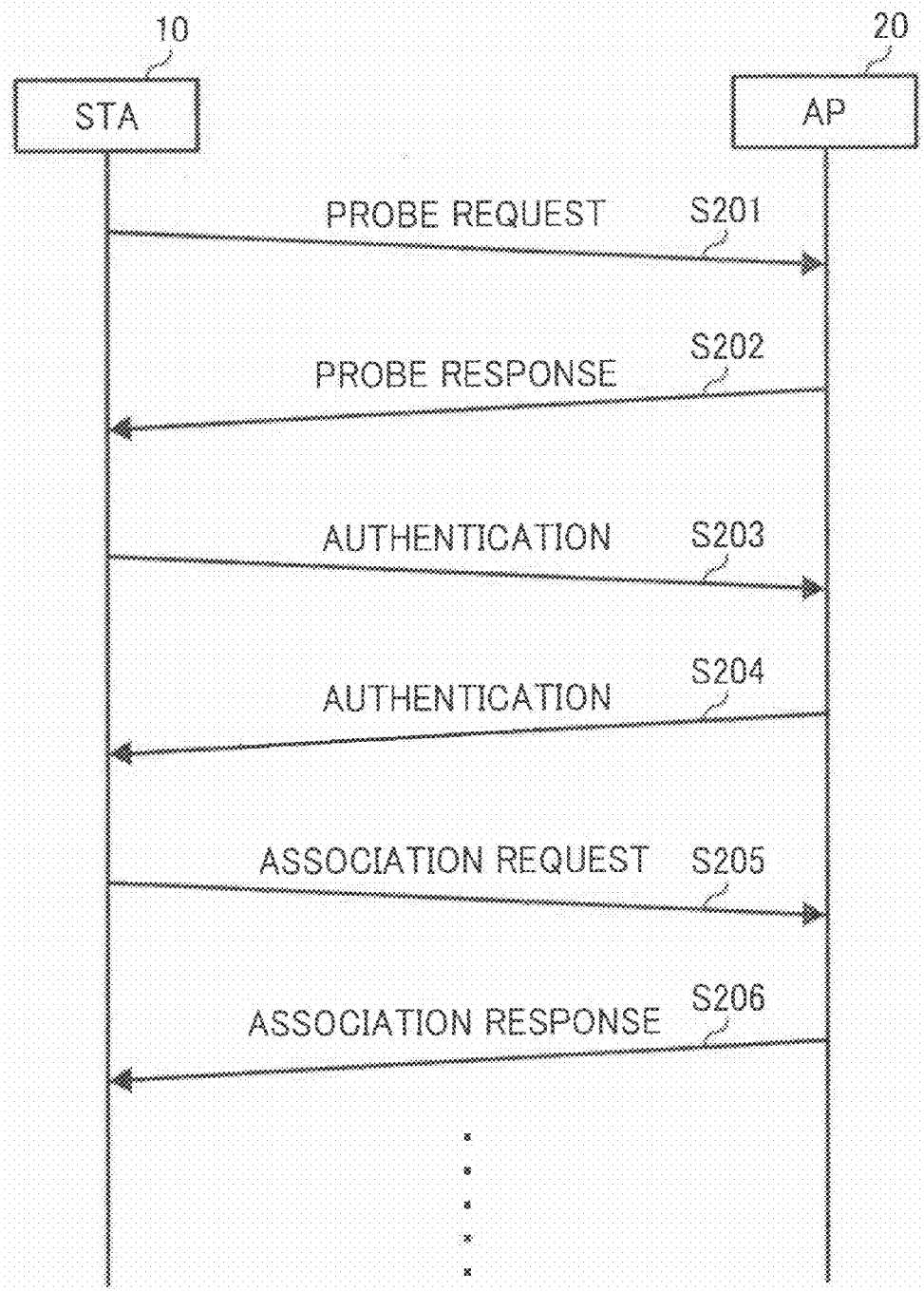
FIG. 2 is a sequent diagram of a process of establishing a connection according to the first embodiment.

A process of establishing the connection between the STA 10 and the AP 20 is described with reference to FIG. 2. FIG. 2 is a sequent diagram of the process of establishing the connection according to the first embodiment.

The STA 10 transmits the probe request frame to the AP 20 (Step S201). Upon receiving the probe request frame, the AP 20 returns the probe response frame to the STA 10 as the response (Step S202).

FIG. 3 is a schematic diagram for explaining a data structure of the probe request frame. The probe request frame, which is an IEEE 802.11 frame, includes a media access control (MAC) address (including a source address (src. address) and a destination address (des. address)), a basic service set identifier (BSSID), and an SSID. The MAC address is unique to each device, and thereby can be used as data for identifying the AP 20. The MAC address of the STA 10 is set in the src. address. Data "FF:FF;FF;FF;FF;FF" indicating based on the IEEE 802.11 standards that the probe request frame is to be sent as a broadcast frame is set in the des. address. Alternatively, as described later, the MAC address of the AP 20 can be set in the des. address.

If the probe request frame in which the SSID is specified and BSSID is not specified is sent, all the APs 20 having the same SSID as the specified SSID return probe response frames. If the probe request frame in which both the SSID and the BSSID are specified is sent, all the APs 20 having the same SSID as the specified SSID and the same BSSID as the specified BSSID return probe response frames.

FIG. 4 is a schematic diagram for explaining a data structure of the probe response frame. The probe response frame, which is an IEEE 802.11 frame, includes the MAC address (including the src. address and the des. address), the BSSID, and the SSID. The MAC address of the AP 20 is set in the src. address. The MAC address of the STA 10 is set in the des. address. The probe response frame additionally includes various data about the AP 20 such as an available channel, a connection protocol, and a nationality.

Referring back to FIG. 2, the STA 10 and the AP 20 mutually transfer messages for authentication (Step S203 and Step S204). If the AP 20 and the STA 10 are authentic, the STA 10 tries to establish a connection with the AP 20 by using the SSID that is extracted from the probe response frame. More particularly, the STA 10 transmits an association request frame including the SSID to the AP 20 (Step S205). If the received association request frame allows establishing of the connection, the AP 20 returns an association response frame indicative of success of the connection to the STA 10 (Step S206).

In this manner, the connection between the STA 10 and the AP 20 is established, which allows data transaction between the STA 10 and the AP 20. If encrypted data is to be transferred, messages for encryption authentication are transferred after the connection is established. After that, a roaming process is performed to maintain the connection.

A manner of scanning for the connectable APs 20 in the roaming process is described below. The SSID, in general, is used for a search key for scanning for the connectable APs 20. The MAC address of the AP 20, in general, is used as the BSSID. In other words, the BSSID corresponds to identification data for identifying the APs 20 (device identification data). It is noted that in an ad-hoc mode where no AP 20 is used, the BSSID does not have a fixed value. Because the roaming process according to the first embodiment is applied to an infrastructure mode where the AP 20 is used, the MAC address is used as the BSSID.

There are two types of scanning, i.e., active scanning and passive scanning. In the active scanning, the STA 10 transmits the probe request frame, and acquires data about the AP 20 (hereinafter, "AP information") from the probe response frame received as the response to the probe request frame from the AP 20. In the passive scanning, the STA 10 receives, without transmitting the probe request frame, a beacon frame that is periodically emitted from the AP 20, and acquires the AP information from the received beacon frame.

The active scanning is performed in a shorter time because the STA 10 transmits the probe request frame at desired timing and the AP 20 returns the probe request frame as the response to the probe request frame. The passive scanning, in contrast, is the manner of passively acquiring the AP information from the beacon frame. Because the typical beacon frame is emitted every 100 milliseconds, the scanning time required in the passive scanning is longer.

The information included in the beacon frame is almost equivalent to that included in the probe response frame. That is, the difference between the active scanning and the passive scanning is only the scanning time for acquiring the AP information. Although the following description is made on the assumption that the active scanning is used, it is allowable to use the passive scanning instead of the active scanning. Therefore, the term "scanning" is used simply in the following description.

A process when the STA 10 moves from the coverage area 31 to the coverage area 32 is described with reference to FIGS. 1 and 5.

When the STA 10 physically moves away from the current AP 20 during the data communications, a state of the radio wave will become poorer. Therefore, the STA 10 periodically scans for the APs even during the data communications. The reason for doing this is to check a current state of the radio wave from the current AP and to detect whether the AP 20 having a better radio-wave state that is selectable as the next AP 20 is present when the radio-wave state of the current AP becomes terribly poor.

More particularly, as shown in FIG. 1, the STA 10 transmits the probe request frame at arbitrary intervals even during the data communications after the connection with the AP 20*a* is established. The STA 10 then waits for the probe response frame from the current AP 20, i.e., the AP 20*a*.

As long as the STA 10 is within the coverage area 31 of the AP 20*a*, the STA 10 will receive the probe response frame from the AP 20*a*. However, there is a possibility that the STA 10 cannot receive the probe response frame because of a poor state of the radio wave. For example, when the STA 10 is moving from the coverage area 31 to the coverage area 32, the intensity of the radio wave will decrease. Eventually, the STA 10 may not receive the probe response frame from the AP 20*a*.

FIG. 5 is a schematic diagram of a situation where the STA 10 has moved to the coverage area 32. The STA 10 transmits the probe request frame to every AP 20 including the AP 20*a* as a broadcast frame. Therefore, when the STA 10 comes closer to the AP 20*b*, not only the AP 20*a* but also the AP 20*b* returns the probe response frame to the STA 10.

Two SSID management systems are described with reference to FIGS. 6 and 7. FIG. 6 is a schematic diagram of a first management system in which different SSIDs are allocated on the floor-to-floor basis. As shown in FIG. 6, the SSID "Floor4" is allocated to all the APs, i.e., the APs 20*a* and 20*b*, that are installed on the fourth floor; and an SSID "Floor3" is allocated to all the APs, i.e., APs 20*c* and 20*d*, that are installed on the third floor.

FIG. 7 is a schematic diagram of a second management system in which a single SSID is allocated to all the APs installed inside the building. If, for example, a single company occupies the whole building, an SSID indicative of the company name is allocated to all the APs. As shown in FIG. 7, an SSID "CompanyName" is allocated to the APs 20*a* and 20*b* that are installed on the fourth floor and the APs 20*c* and 20*d* that are installed on the third floor.

Either the first management system or the second management system can be applied to the first embodiment.

Figure 8:
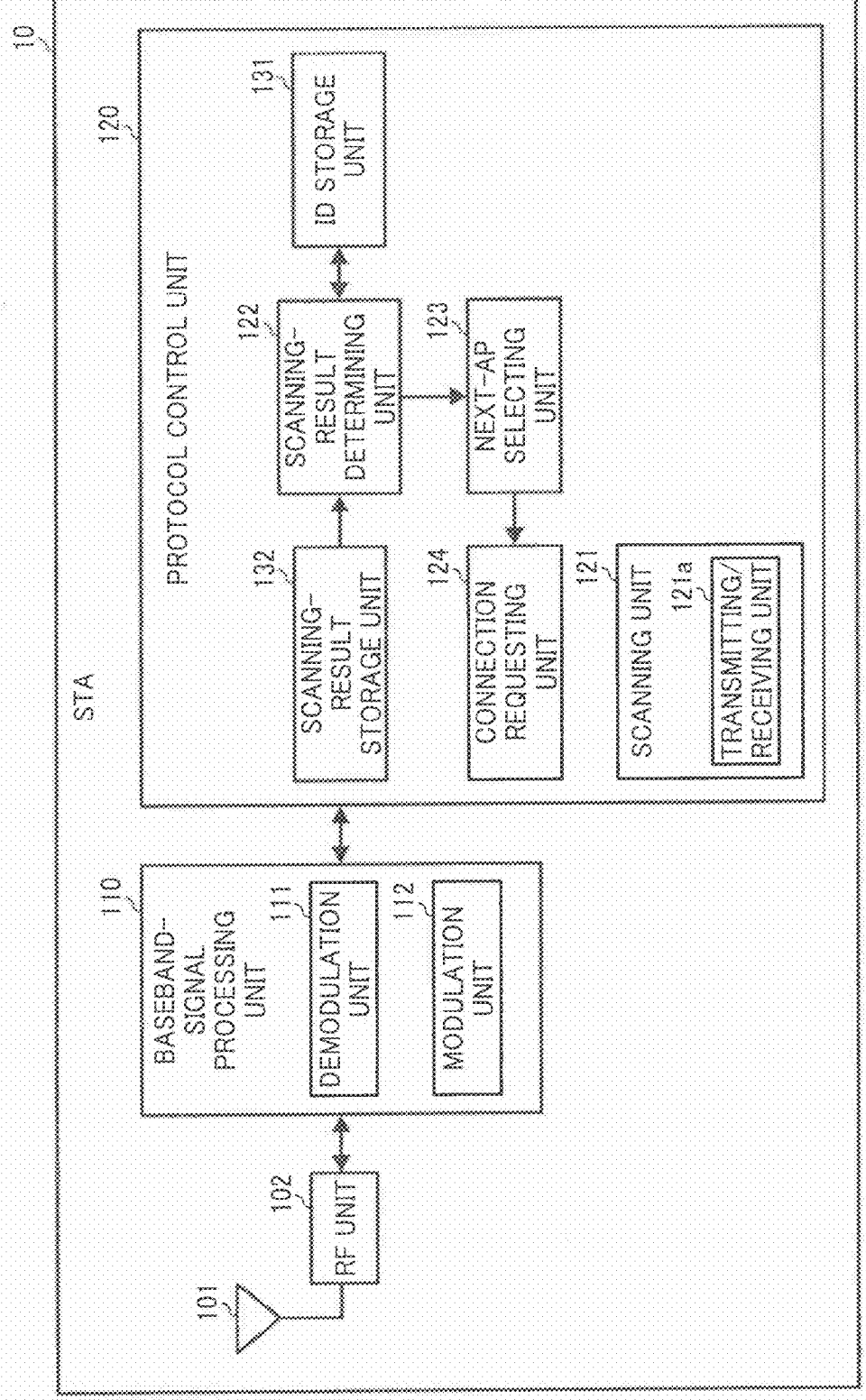
FIG. 8 is a block diagram of the STA according to the first embodiment.

The configuration of the STA 10 is described in details with reference to FIG. 8. FIG. 8 is a block diagram of the STA 10 according to the first embodiment. The STA 10 includes an antenna 101, a radio frequency (RF) unit 102, a baseband-signal processing unit 110, and a protocol control unit 120.

The antenna 101 is used to transmit/receive the radio wave, thereby implementing the wireless communication between the STA 10 and an external device such as the AP 20. The RF unit 102 performs frequency conversion, power amplification, and the like.

The baseband-signal processing unit 110 is a control unit that performs frequency modulation/demodulation by using, for example, an orthogonal frequency-division multiplexing (OFDM) scheme based on the IEEE 802.11. The OFDM is a scheme for effective utilization of a frequency band used as a multi-carrier modulation method. The carriers are modulated in such a manner that phases of adjacent carriers are set orthogonal to each other with parts of the phases overlapped with each other. The OFDM scheme is used in IEEE 802.11a and IEEE 802.11g that are standards for the wireless LAN. The baseband-signal processing unit 110 includes a demodulation unit 111 that performs a demodulation process, and a modulation unit 112 that performs a modulation process.

The protocol control unit 120 controls, based on an IEEE 802.11 protocol, wireless transmitting/receiving of messages (frames) to/from the external device. The protocol control unit 120 includes an ID storage unit 131, a scanning-result storage unit 132, a scanning unit 121, a scanning-result determining unit 122, a next-AP selecting unit 123, and a connection requesting unit 124.

The ID storage unit 131 stores therein the SSID and the BSSID of the current AP 20. If the STA 10 establishes the connection with the AP 20 at the end of the sequence shown in FIG. 2, the STA 10 stores the SSID and the BSSID of the connected AP 20 in the ID storage unit 131.

The scanning-result storage unit 132 stores therein a first list and a second list, each of which including the connectable APs 20 as a scanning result that is obtained by transmitting the probe request frame and receiving the probe response frames. FIGS. 9 and 10 are schematic diagrams of data structures of the first list and the second list that are stored in the scanning-result storage unit 132.

FIG. 9 is a schematic diagram of the first list including the APs 20 having the SSID same as the SSID stored in the ID storage unit 131. The first list includes name of the AP 20 (AP name) from which the probe response frame is received, SSID allocated to the AP 20, BSSID unique to the AP 20, src. address indicative of the MAC address of the AP 20, incoming signal intensity, and supported rates.

The incoming signal intensity is an intensity of the incoming signal from the AP 20. The supported rates are transfer rates supported by the AP 20. The supported rates are acquired from the probe response frame. The first list can additionally include other information extracted from the probe response frame.

FIG. 10 is a schematic diagram of the second list including the AP 20 having the SSID and the BSSID both same as the SSID and the BSSID stored in the ID storage unit 131. The data structure of the second list is the same as that of the first list in the first embodiment. However, the data structures of the first list and the second list can be different.

Referring back to FIG. 8, the scanning unit 121 performs a process of scanning for the connectable APs 20. The scanning unit 121 includes a transmitting/receiving unit 121a that transmits/receives messages to/from the external device including the AP 20.

The scanning unit 121 generates the probe request frame, and the transmitting/receiving unit 121a transmits the generated probe request frame. Moreover, the scanning unit 121 receives the probe response frame from the AP 20 via the transmitting/receiving unit 121a. The scanning unit 121 generates the first list and the second list from the received probe response frame, and stores the generated first list and the generated second list in the scanning-result storage unit 132.

The scanning unit 121 scans for the APs by using every available channel. As prescribed in the IEEE 802.11, available bands of the channels are decided by nations according to the laws in those nations. In Japan, for example, it is possible to establish a single wireless LAN by using one of 14 channels in a 2.4-gigahertz (GHz) band (more particularly, band from 2.412 GHz to 2.484 GHz) or one of 12 channels in a 5-GHz band (more particularly, band from 5.17 GHz to 5.32 GHz). Therefore, the scanning unit 121 scans 26 channels in total including 12 channels of the 2.4-GHz and 14 channels of the 5-GHz band.

The scanning-result determining unit 122 determines whether the connection with the current AP 20 is maintainable by referring to the second list stored in the scanning-result storage unit 132. As described above, the second list includes the AP 20 having the SSID and the BSSID both same as the SSID and the BSSID of the current AP 20 stored in the ID storage unit 131. More particularly, the scanning-result determining unit 122 determines whether the connection with the current AP 20 is maintainable by the presence of data in the second list.

When the scanning-result determining unit 122 determines that the connection with the current AP 20 is unmaintainable, the next-AP selecting unit 123 selects the next AP 20. For example, the next-AP selecting unit 123 selects the AP 20 having the strongest incoming signal intensity from among the connectable APs as the next AP by referring to the first list.

The connection requesting unit 124 transmits a connection request to the next AP 20 that is selected by the next-AP selecting unit 123, and switches to the next AP 20.

The STA 10 includes, although not shown, a central processing unit (CPU) that controls the STA 10, a static random access memory (SRAM) that is used as a work area of the CPU, and a read only memory (ROM) that stores therein computer programs run by the CPU.

The SRAM can be used as the scanning-result storage unit 132 and the ID storage unit 131. It can be configured that the CPU loads the computer programs from the ROM, and runs the computer programs, thereby implementing the scanning unit 121, the scanning-result determining unit 122, the next-AP selecting unit 123, and the connection requesting unit 124. In other words, those units can be implemented by using either software or hardware circuits.

Figure 11:
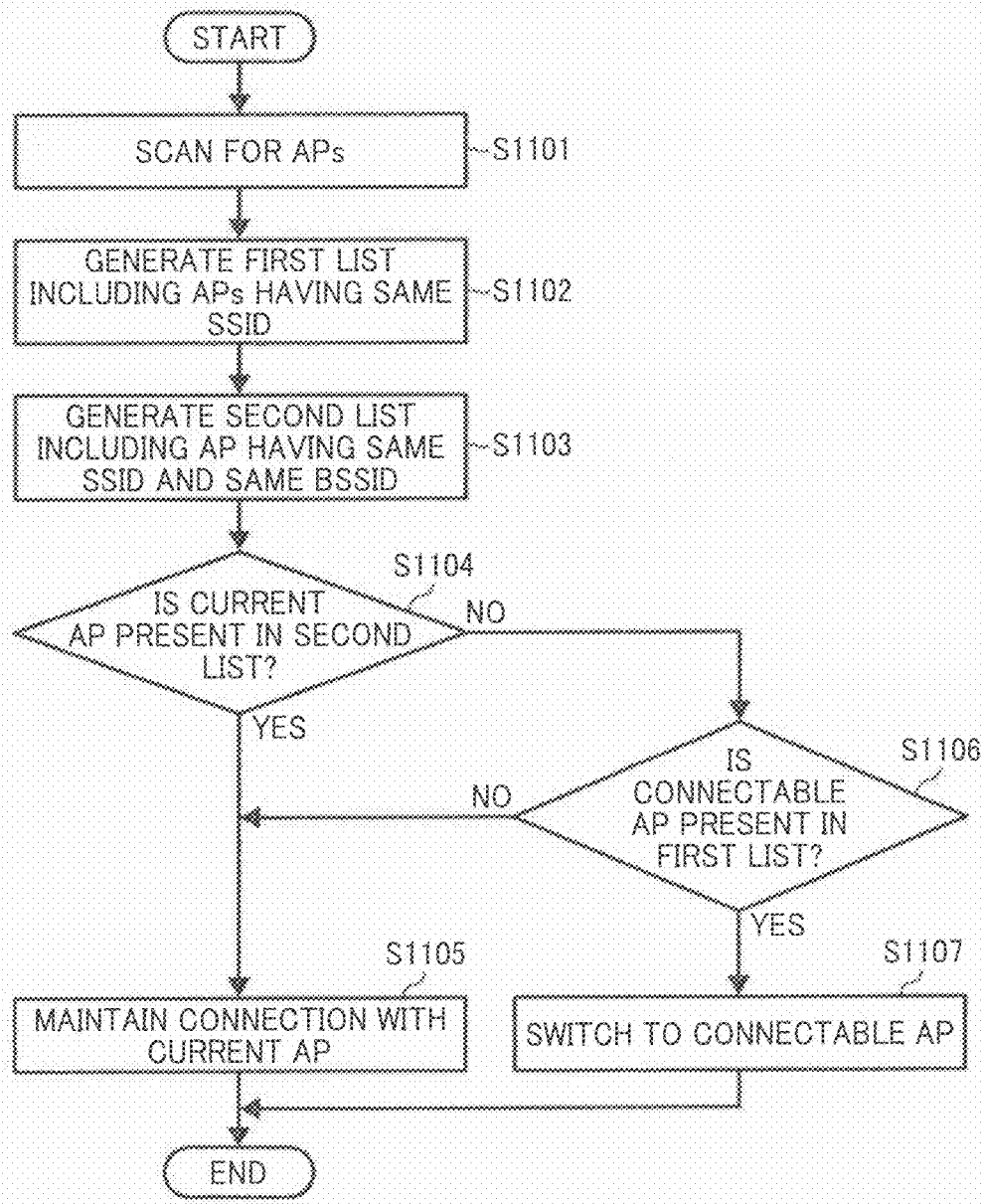
FIG. 11 is a general flowchart of a roaming process according to the first embodiment.

The roaming process performed by the STA 10 according to the first embodiment is described below. FIG. 11 is a general flowchart of the roaming process according to the first embodiment.

It is noted that, as described above, the SSID and the BSSID of the current AP 20 are stored in the ID storage unit 131 before beginning the roaming process.

The scanning unit 121 scans for the connectable APs 20 (Step S1101). More particularly, the scanning unit 121 identifies the SSID of the current AP 20, generates the probe request frame including the identified SSID, and transmits the generated probe request frame via the transmitting/receiving unit 121a. After that, the scanning unit 121 receives, via the transmitting/receiving unit 121a, the probe response frame from each of the APs that receives the probe request frame.

The scanning unit 121 generates the first list including the APs 20 having the SSID same as the SSID of the current AP 20 by referring to information extracted from the received probe request frames (Step S1102).

The scanning unit 121 generates the second list including the AP 20 having the SSID and the BSSID both same as the SSID and the BSSID of the current AP 20 by referring to information extracted from the received probe request frame (Step S1103). The process at Step S1103 can be performed prior to the process at Step S1102. Alternatively, those processes at Step S1102 and Step S1103 can be performed in parallel.

The scanning-result determining unit 122 determines whether information about the current AP 20 is present in the second list (Step S1104). In most cases, the information about the current AP 20 is present in the second list. However, if the STA 10 does not receive the probe response frame from the current AP 20 because of the poor radio-wave state etc., the information about the current AP 20 is not present in the second list.

If the information about the current AP 20 is present in the second list (Yes at Step S1104), the protocol control unit 120 maintains the connection with the current AP 20 (Step S1105).

If the information about the current AP 20 is not present in the second list (No at Step S1104), the next-AP selecting unit 123 determines whether any connectable AP 20 is present in the first list (Step S1106).

If no connectable AP 20 is present (No at Step S1106), because no AP 20 is selectable as the next AP 20, the protocol control unit 120 maintains the connection with the current AP 20 (Step S1105). With this configuration, the connection will be maintained even in a scanning failure, i.e., even when the probe response frame from the current AP 20 fails to be received because of, for example, radio wave interference.

If the connectable AP 20 is present (Yes at Step S1106), the connection requesting unit 124 transmits the connection request to the connectable AP 20, thereby switching to the connectable AP 20 (Step S1107). If two or more connectable APs 20 are present in the first list, the connection requesting unit 124 switches to, for example, the AP 20 having the strongest incoming signal intensity from among the connectable APs in the first list.

In this manner, the communication apparatus (STA) according to the first embodiment scans for the connectable APs by transmitting/receiving the predetermined messages. Thus, if the current AP is included in the connectable APs, the communication apparatus maintains the connection with regardless of the intensity of the radio wave. If the current AP is not included in the connectable APs, the communication apparatus switches to another AP.

With this configuration, a loss of the data transmission time caused by the roaming is reduced as compared with the conventional roaming process of switching between the APs by the determination that is made based on only a comparison between the intensities of the radio waves. Moreover, this configuration, which allows the STA to connect to the target AP, can be implemented by modifying the STA only, without adding a dedicated interface and a dedicated control frame to both the APs and the STA. Furthermore, this improves the security as an effect. Suppose, for example, that the STA approaches a spoofed AP having a spoofed SSID emitting a strong radio wave. Because the STA does not always switch to the AP with the intensity of the radio wave stronger than that of the current AP in the present embodiment, it can be considered that the wireless communications security is improved. Moreover, because no software modification for the APs is needed, it is possible to improve the wireless communications security even if the old-type APs are used.

A communication apparatus according to a second embodiment of the present invention scans for the APs twice, with a specified SSID at the first scanning and with a specified SSID and a specified BSSID at the second scanning. The communication apparatus determines whether the connection with the current AP is maintainable based on a result of the second scanning. If the connection with the current AP is unmaintainable, the communication apparatus selects the next AP by referring to a result of the first scanning.

Figure 12:
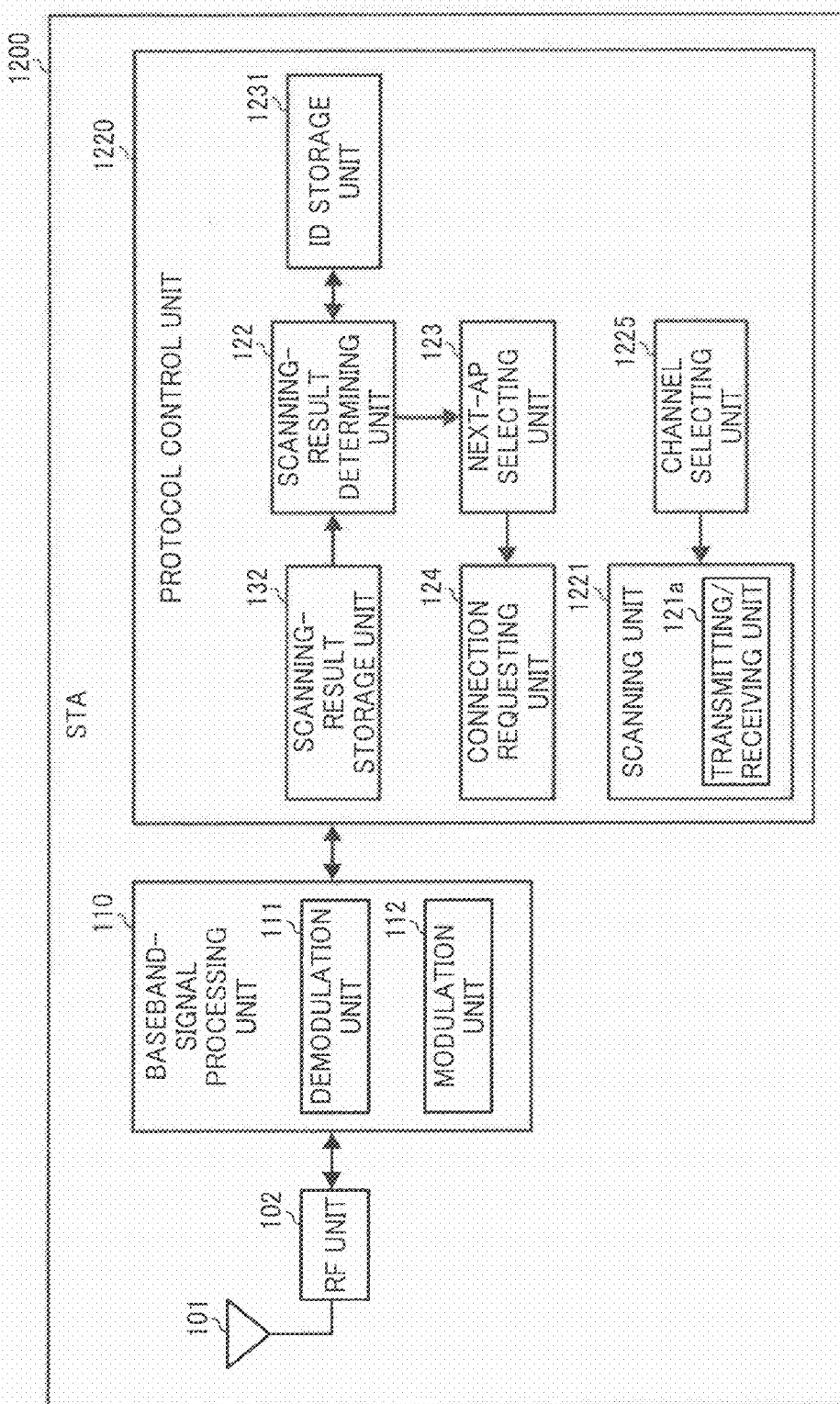
FIG. 12 is a block diagram of an STA according to a second embodiment of the present invention.

FIG. 12 is a block diagram of an STA 1200 according to the second embodiment. The STA 1200 includes the antenna 101, the RF unit 102, the baseband-signal processing unit 110, and a protocol control unit 1220.

The configuration of the STA 1200 according to the second embodiment is almost the same as that of the STA 10 according to the first embodiment except for information stored in an ID storage unit 1231, a function of a scanning unit 1221, and a channel selecting unit 1225 that is added to the protocol control unit 1220. Parts corresponding to those in the first embodiment shown in FIG. 8 are denoted with the same reference numerals, and the same description is not repeated.

The ID storage unit 1231 stores therein information about a channel connecting to the current AP 20 in addition to the SSID and the BSSID of the current AP 20. The information about the channel can be stored in a storage unit (not shown) other than the ID storage unit 1231.

The scanning unit 1221 scans for the connectable APs twice. More particularly, the scanning unit 1221 performs the first scanning with the specified SSID. The scanning unit 1221 performs the second scanning with the specified SSID and the specified BSSID. The first scanning and the second scanning can be performed in any order.

As a result of the first scanning, the information about the APs 20 having the same SSID is acquired. The APs 20 having the same SSID include the current AP 20 and other APs selectable as the next AP 20. As a result of the second scanning, the information about the AP 20 having the same SSID and the same BSSID is acquired. That is, only the current AP 20 will remain in the list.

Effects of performing the first scanning and the second scanning, independently are described below. As described above, the information about all the APs 20 having the same SSID is acquired in the first scanning. If the number of the APs 20 having the same SSID is large and an amount of the information is larger than an available memory capacity, there is a possibility that the information about the current AP 20 may not be stored in the ID storage unit 1231 because of lack of the memory. An amount of each piece of the typical AP information is from about 100 bytes to about 200 bytes. Therefore, an available memory capacity of 1 kilobyte is required for eight pieces of the AP information.

In the second embodiment, eight connectable APs 20 selected from the top are present in the list in the first scanning, and the current AP 20 is present in the list in the second scanning. With this configuration, it is possible to determine whether the current AP 20 is connectable and select the next AP 20, without replacing the memory with a memory having a larger capacity. That is, necessary AP information is effectively acquired with a small memory capacity.

The scanning unit 1221 performs the second scanning by using only a channel that is selected by the channel selecting unit 1225 as the channel connecting to the current AP 20.

The channel selecting unit 1225 selects the channel to be used in the second scanning performed by the scanning unit 1221. More particularly, the channel selecting unit 1225 selects the channel stored in the ID storage unit 1231 as the channel to be used in the second scanning.

Because the second scanning is performed by using the specified channel, the information about the AP 20 is acquired in a short time, which allows a rapid switch to the next AP 20 if the current AP is unmaintainable. Effects of this configuration are described below with an example.

For example, Japanese laws restrict certain actions in the 5-GHz band channel. More particularly, because a channel band called "W53" is overlapped with the band for the weather radar and the band for the air traffic radar, the radio wave cannot be emitted in W53 channels until a wireless local area network (WLAN) administrator confirms that no radar is found. It means that the active scanning cannot be performed until no AP 20 is found in the W53 channels.

As described above, the active scanning allows rapid acquiring of the AP information. However, if the active scanning cannot be performed, there is no choice other than the passive scanning. The STA has to wait for the beacon frames in the passive scanning. In general, the STA has to wait for several beacon frames for prevention of miss-receiving of the beacon frames. If the STA is set to receive four beacon frames that are emitted at 100 millisecond (ms) intervals, the required time is 0.4 second (=100 ms×4) per channel. Because four channels are available in the W53, the waiting time in the passive scanning is from about 1.5 seconds to about 2 seconds.

In other words, if all the channels are used at the second scanning, about 2 seconds of the scanning time is required. In contrast, because only the specified channel is used at the second scanning in the second embodiment, only about 50 ms of the scanning time is required.

Figure 13:
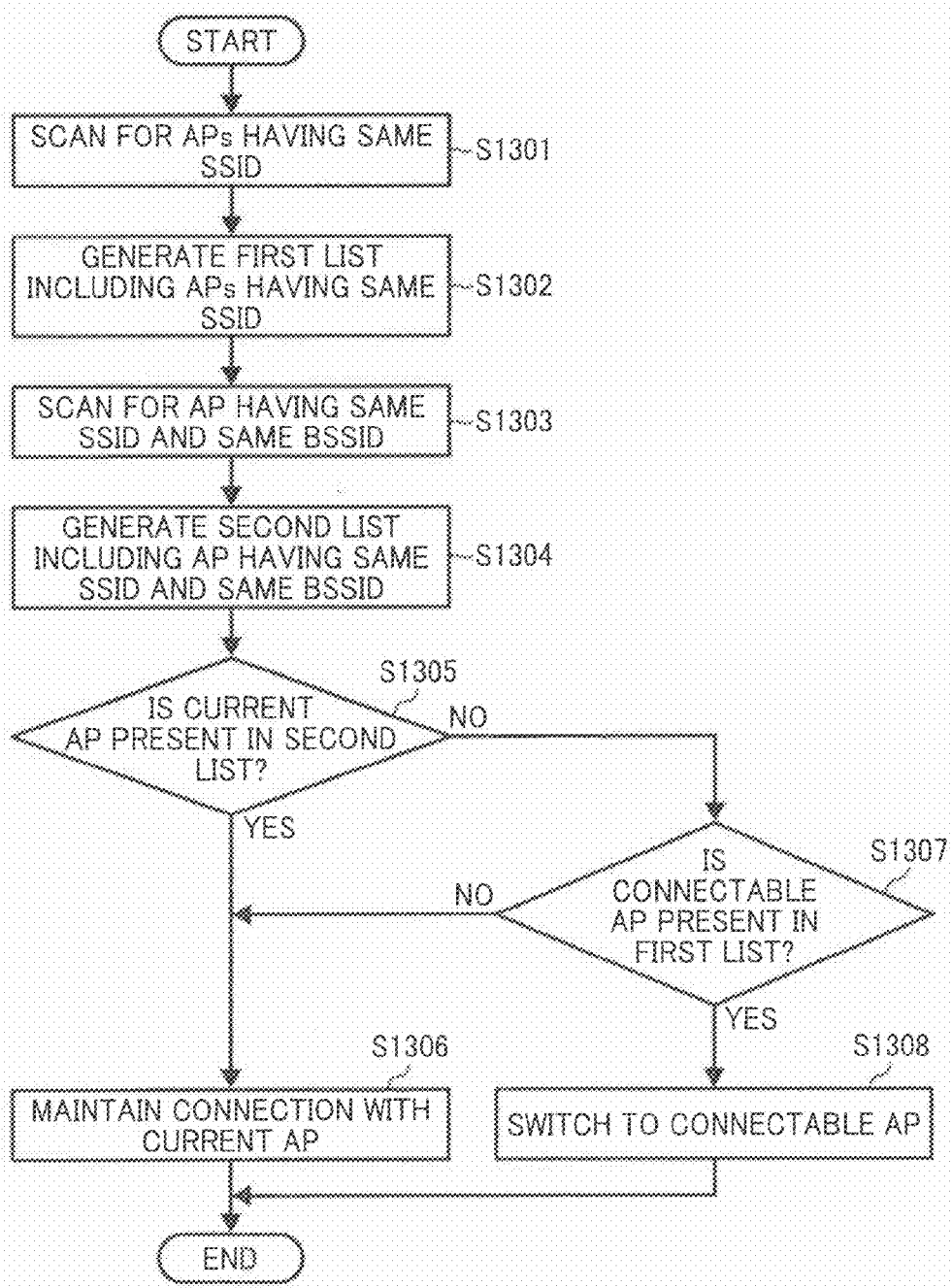
FIG. 13 is a general flowchart of a roaming process according to the second embodiment.

A roaming process performed by the STA 1200 according to the second embodiment is described below. FIG. 13 is a general flowchart of the roaming process according to the second embodiment.

The scanning unit 1221 scans for the connectable APs 20 having the same SSID (Step S1301). More particularly, the scanning unit 1221 identifies the SSID of the current AP 20, generates the probe request frame including the identified SSID, and transmits the generated probe request frame by using the transmitting/receiving unit 121*a*. After that, the scanning unit 1221 receives by using the transmitting/receiving unit 121*a* the probe response frame from each of the APs that receive the probe request frame. It is noted that the scanning unit 1221 performs the scanning with the specified SSID via every available channel.

The scanning unit 1221 generates the first list including the APs 20 having the SSID same as the SSID of the current AP 20 by referring to information extracted from the received probe request frames (Step S1302).

The scanning unit 1221 scans for the connectable AP 20 having the same SSID and the same BSSID (Step S1303). More particularly, the scanning unit 1221 identifies the SSID and the BSSID of the current AP 20, generates the probe request frame including the identified SSID and the identified BSSID, and transmits the generated probe request frame via the transmitting/receiving unit 121*a*. After that, the scanning unit 1221 receives, via the transmitting/receiving unit 121*a*, the probe response frame from the AP that receives the probe request frame.

The scanning unit 1221 performs the second scanning with the identified SSID via the channel connecting to the current AP 20. More particularly, the channel selecting unit 1225 acquires data about the channel connecting to the current AP 20 from the ID storage unit 1231. The scanning unit 1221 performs the second scanning via the channel that is identified by the data that is acquired by the channel selecting unit 1225.

The scanning unit 1221 generates the second list including the AP 20 having the SSID and the BSSID both same as the SSID and the BSSID of the current AP 20 by referring to information extracted from the received probe request frame (Step S1304).

Processes of making connection determination, i.e., process in Step S1305 to Step S1308, is the same as those from Step S1104 to Step S1107 performed by the STA 10 in the first embodiment, and therefore the same description is not repeated.

In this manner, the STA 1200 according to the second embodiment performs the first scanning with the specified SSID and the second scanning with the specified SSID and the specified BSSID. The STA 1200 determines whether the connection with the current AP is maintainable from the result of the second scanning. With this configuration, the necessary AP information is acquired effectively, without replacing the memory with a memory having a larger capacity.

The probe request frame used in the scanning is sent as the broadcast frame, in general. In the broadcast frame, it is defined according to the IEEE 802.11 standards that the des. address shown in FIG. 3 is set as "FF:FF:FF:FF:FF:FF".

In the second embodiment, to confirm whether the current AP 20 is connectable, the STA 1200 transmits the probe request frame including the specified BSSID in the second scanning so as to receive the prove response frame only from the current AP 20. The BSSID is used as the information for identifying the current AP 20.

However, upon receiving the broadcast frame, some of the APs 20 return the probe response frame with regardless of the BSSID. In other words, although the BSSID is specified, the STA may receive the probe response frame from the AP 20 having different BSSID in the second scanning.

In a first modification of the second embodiment, the MAC address is specified instead of the BSSID in the second scanning. In other words, the second scanning is performed by transmitting the probe request frame including the MAC address of the current AP 20 that is set in the des. address. This probe request frame works as a scan request dedicated to the current AP 20. Upon receiving the probe request frame, the current AP 20 returns the probe response frame. If the current AP 20 cannot receive the probe request frame, the STA receive no response. Even if the APs 20 other than the current AP 20 receive the probe request frame, no APs 20 returns the response because the probe request frame is not a broadcast frame and the destination of the probe request frame is the AP 20 other than itself. A roaming process according to the first modification is the same as the roaming process according to the second embodiment shown in FIG. 13.

According to the first modification, because the des. address is set, only the target AP 20, i.e., the current AP 20 returns the probe response frame.

In a second modification of the second embodiment, both the BSSID and the MAC address are specified. Usage of the probe request frame that includes the specified BSSID and the MAC address set in the des. address further ensures the response from the current AP 20.

A communication apparatus according to a third embodiment of the present invention detects the intensities of the radio waves received from the APs, and when the intensity of the radio wave received from the current AP is weaker than a threshold, the communication apparatus switches form the current AP to another AP.

Figure 14:
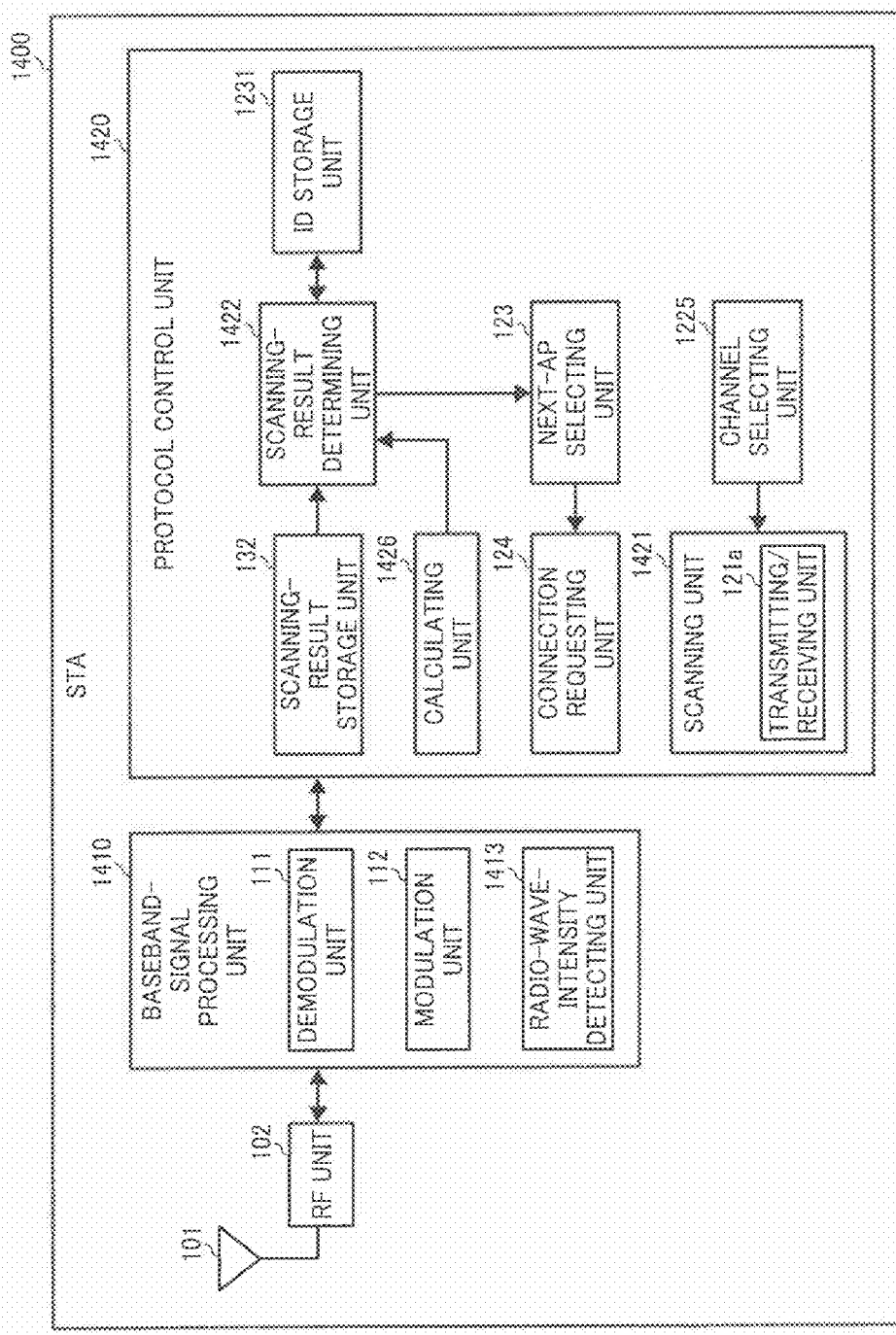
FIG. 14 is a block diagram of an STA according to a third embodiment according to the present invention.

FIG. 14 is a block diagram of an STA 1400 according to the third embodiment. The STA 1400 includes the antenna 101, the RF unit 102, a baseband-signal processing unit 1410, and a protocol control unit 1420.

The configuration of the STA 1400 according to the third embodiment is almost the same as that of the STA 1200 according and the second embodiment except for a radio-wave-intensity detecting unit 1413 added to the baseband-signal processing unit 1410, a calculating unit 1426 added to the protocol control unit 1420, a function of a scanning unit 1421, and a function of a scanning-result determining unit 1422. Parts corresponding to those in the second embodiment shown in FIG. 12 are denoted with the same reference numerals, and the same description is not repeated.

In contrast to the scanning unit 1221 according to the second embodiment, the scanning unit 1421 performs the second scanning several times.

The radio-wave-intensity detecting unit 1413 detects the intensity of the radio wave received from the AP 20. The radio-wave-intensity detecting unit 1413 can represent the intensity of the radio wave by an analog-to-digital (AD) converted value of a received signal strength indicator (RSSI).

The calculating unit 1426 calculates an average of the intensities of the radio waves each of which is detected by the radio-wave-intensity detecting unit 1413 at each second scanning. This improves reliability and performance of the second scanning that affects the determination about switching between the APs. The STA can be configured to perform the second scanning only once in the same manner in the second embodiment, excluding the calculating unit 1426.

The scanning-result determining unit 1422 determines whether the connection with the current AP 20 is maintainable. Moreover, even if the connection with the current AP 20 is maintainable, if the intensity of the radio wave of the current AP 20 is weaker than the threshold, the scanning-result determining unit 1422 determines that the STA 1400 is to switch from the current AP 20 to another AP 20.

A roaming process performed by the STA 1400 according to the third embodiment is described. FIG. 15 is a general flowchart of the roaming process according to the third embodiment.

Processes of generating the lists and of making determinations based on the lists, i.e., process in Step S1501 to Step S1505, are almost the same as those from Step S1301 to Step S1305 performed by the STA 1200 in the second embodiment, and therefore the same description is not repeated.

It is noted that, in the third embodiment, the second scanning (Step S1503) is performed several times. The intensities of the radio waves are detected at each second scanning. The calculating unit 1426 calculates an average of the intensities of the radio waves (not shown in FIG. 15).

If it is determined that the information about the current AP 20 is present in the second list (Yes at Step S1505), the scanning-result determining unit 1422 determines whether the average intensity of the radio waves received from the current AP 20 is stronger than the threshold (Step S1506). If the average intensity of the radio waves is stronger than the threshold (Yes at Step S1506), the protocol control unit 1420 maintains the connection with the current AP 20 (Step S1507).

On the other hand, if the average intensity of the radio waves is not stronger than the threshold (No at Step S1506), the next-AP selecting unit 123 determines whether any connectable AP 20 is present in the first list (Step S1508).

If no connectable AP 20 is present in the first list (No at Step S1508), because no AP selectable as the next AP 20 is present, the protocol control unit 1420 maintains the connection with the current AP 20 (Step S1507).

If the connectable AP 20 is present in the first list (Yes at Step S1508), the connection requesting unit 124 transmits the connection request to the connectable AP 20, and switches to the connectable AP 20 (Step S1509).

In the third embodiment, if the intensity of the radio wave received from the current AP 20 is weaker than the threshold, the STA 1400 determines that the current AP 20 is away from the STA 1400 (actually, the STA 1400 moves away from the current AP 20), and actively tries to switch to another AP 20. This configuration makes the data communications more stable.

In the third embodiment, the intensity of the radio wave is used to determine the roaming process. In a third modification of the third embodiment, a signal-to-noise ratio (S/N ratio) is used instead of the intensity of the radio wave. The S/N ratio is a ratio of the intensity of the radio wave to a level of noise (intensity of noise). For example, an STA according to the third modification includes an S/N ratio detecting unit that detects the S/N ratio instead of the radio-wave-intensity detecting unit 1413. More particularly, the S/N ratio detecting unit detects the AD converted value of the RSSI measured in a signal-less state where no radio wave is received as the level of noise. The calculating unit 1426 calculates a ratio of the intensity of the radio wave to the level of noise as the S/N ratio. It is allowable to perform the second scanning several times in the same manner as in the third embodiment, and calculate an average of the S/N ratios by the calculating unit 1426.

In a fourth modification of the third embodiment, an indicator indicative of quality of the received signal such as an error vector magnitude (EVM) is used instead of the intensity of the radio wave or the S/N ratio. For example, an STA according to the fourth modification includes a quality indicator detecting unit that detects the EVM instead of the radio-wave-intensity detecting unit 1413. The EVM is a value indicative of a difference between the actually received signal and the ideal point on an I-Q plane. The quality of the signal is determined based on the value of the EVM. See 17.3.10 of the IEEE 802.11 standards for details of the EVM.

It is allowable to perform the second scanning several times, calculate an average of the EVMs, and compare the average with the threshold. Alternatively, it is allowable to perform the second scanning once, and compare the EVM with the threshold.

In a fifth modification of the third embodiment, when it is determined that the intensity of the radio wave received from the current AP is weaker than the threshold, an STA 1600 according to the fifth modification switches to the AP having the intensity of the radio wave stronger than the threshold. FIG. 16 is a block diagram of the STA 1600. The STA 1600 includes the antenna 101, the RF unit 102, the baseband-signal processing unit 1410, and a protocol control unit 1620.

The configuration of the STA 1600 according to the fifth modification is almost the same as that of the STA 1400 according to the third embodiment, except for a function of a next-AP selecting unit 1623 of the protocol control unit 1620. Parts corresponding to those in the third embodiment shown in FIG. 14 are denoted with the same reference numerals, and the same description is not repeated.

The next-AP selecting unit 1623 selects the AP 20 having the intensity of the radio wave stronger than the threshold from among the APs 20 in the first list as the next AP 20.

A roaming process performed by the STA 1600 according to the fifth modification is described below. FIG. 17 is a general flowchart of the roaming process according to the fifth modification.

The roaming process according to the fifth modification is almost the same as the roaming process according to the third embodiment shown in FIG. 15, except that a next-AP determining process at Step S1608 is differentiated from the next-AP determining process at Step S1508 shown in FIG. 15. The description about the same processes is not repeated.

The next-AP selecting unit 1623 determines whether the AP 20 having the intensity of the radio wave stronger than the threshold is present in the first list (Step S1608).

In this manner, the intensity of the radio wave received from the AP selectable as the next AP that is detected in the first scanning is used to determine the next AP, in the fifth modification. More particularly, if it is determined from a result of the second scanning that the connection with the current AP is unmaintainable, only when the intensity of the radio wave received from the AP selectable as the next AP is equal to or stronger than the threshold, the STA switches to the next AP. If the intensity of the radio wave received from the AP selectable as the next AP is weaker than the threshold, the STA does not switch to the AP. This configuration makes the data communications more stable.

It is allowable to compare the S/N ratio or the indicator indicative of the quality of the received signal such as the EVM with the threshold to determine the next AP, instead of the intensity of the radio wave. Moreover, it is allowable to use the MAC address instead of the BSSID or both the MAC address and the BSSID in the same manner as in the first modification and the second modification of the second embodiment.

The hardware configuration of the communication apparatus according to any of the first to the third embodiments is described.

The communication apparatus according to any of the first to the third embodiments and modifications thereof has the hardware configuration as a typical computer. The communication apparatus includes a control device such as a CPU, a storage device such as a ROM and a RAM, an hard disk drive (HDD), an external storage device such as a compact disk drive (CD drive), a display device, and an input device such as a keyboard or a mouse.

A communication program executed by the communication apparatus can be stored, in a form of a file that is installable and executable on the communication apparatus, in a recording medium readable by the communication apparatus, such as a compact disk-read only memory (CD-ROM), a flexible disk (FD), a compact disk-recordable (CD-R), and a digital versatile disk (DVD).

On the other hand, the communication program can be stored in another computer connected to the communication apparatus via a network such as the Internet, and downloaded to the communication apparatus via the network. The communication program can be delivered or distributed via a network such as the Internet.

The communication program can be delivered or distributed, for example, in a state preinstalled into a recording medium such as a ROM.

The communication program is, for example, made up of modules that implement the units of the communication apparatus, such as the scanning unit, the scanning-result determining unit, the next-AP selecting unit, and the connection requesting unit as software. When the CPU (processor) reads the communication program from the recording medium and executes the communication program, the above modules are loaded and created on a main memory thereby implementing the units of the communication apparatus.

According to an aspect of the present invention, a loss of data transmission time caused by roaming is reduced.

Moreover, a required memory size is reduced as compared with a memory size required if only scanning with a specified network identification data is performed.

Furthermore, stable data communications are implemented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus capable of connecting to one of a plurality of relay apparatuses that relays wireless communications, the communication apparatus comprising:
   an identification-data storage unit that stores therein first device identification data for identifying a first relay apparatus to which the communication apparatus is currently being connected, the first device identification data being unique to the first relay apparatus;
   a transmitting unit that transmits a request message that requests connectable relay apparatuses to return a response message;
   a receiving unit that receives response messages from the connectable relay apparatuses, each response message including individual device identification data of a relay apparatus that transmitted the request message;
   a determining unit that determines whether received response message includes individual device identification data that matches with the first device identification data stored in the identification-data storage unit; and
   a connection requesting unit that requests, if no received response message includes the individual device identification data that matches with the first device identification data stored in the identification-data storage unit, a second relay apparatus from among relay apparatuses identified by second device identification data that is included in any of the received response messages to make a connection with the communication apparatus, and, if a received response message includes the individual device identification data that matches with the first device identification data stored in the identification-data storage unit, the connection requesting unit maintains the connection with the first relay apparatus that is connected with the communication apparatus.

2. The communication apparatus according to claim 1, wherein
   the relay apparatuses are allocated with network identification data for identifying a wireless network,
   the identification-data storage unit stores therein the first device identification data of the first relay apparatus and first network identification data that is allocated to the first relay apparatus,
   the transmitting unit transmits the request message including the first network identification data stored in the identification-data storage unit, and
   the receiving unit receives, if relay apparatuses that are allocated with the first network identification data receive the request message, a response message from each of the relay apparatuses.

3. The communication apparatus according to claim 2, wherein the network identification data is a service set identifier (SSID) defined by an IEEE 801.11.

4. The communication apparatus according to claim 2, wherein
   the transmitting unit transmits the request message including the first network identification data and the first device identification data both stored in the identification-data storage unit,
   the receiving unit receives, if the relay apparatuses that are allocated with the first network identification data receive the request message including the first network identification data and the first device identification data, the response message from each of the relay apparatuses,
   the determining unit determines whether the response message received from each of the relay apparatuses in response to the request message including the first network identification data and the first device identification data includes the individual device identification data that matches with the first device identification data stored in the identification-data storage unit, and
   the connection requesting unit requests, if no received response message in response to the request message including the first network identification data and the first device identification data includes the individual device identification data that matches with the first device identification data stored in the identification-data storage unit, the second relay apparatus identified by the second device identification data included in any of the received response messages to make the connection with the communication apparatus.

5. The communication apparatus according to claim 4, wherein the device identification data is a basic service set identifier (BSSID) defined by an IEEE 801.11.

6. The communication apparatus according to claim 4, wherein
the identification-data storage unit stores therein channel data indicative of a channel via which data is transmitted wirelessly to or from the first relay apparatus, and
the transmitting unit transmits a request message including the first network identification data but excluding the first device identification data via every channel available in the wireless communications, and transmits the request message including the first network identification data and the first device identification data via the channel that is identified by the channel data stored in the identification-data storage unit.

7. A communication apparatus capable of connecting to one of a plurality of relay apparatuses that relays wireless communications, the communication apparatus comprising:
an identification-data storage unit that stores therein first device identification data for identifying a first relay apparatus to which the communication apparatus is currently being connected, the first device identification data being unique to the first relay apparatus;
a transmitting unit that transmits a request message that requests connectable relay apparatuses to return a response message;
a receiving unit that receives response messages from the connectable relay apparatuses, each response message including individual device identification data of a relay apparatus that transmitted the request message;
a determining unit that determines whether received response message includes individual device identification data that matches with the first device identification data stored in the identification-data storage unit;
a connection requesting unit that requests, if no received response message includes the individual device identification data that matches with the first device identification data stored in the identification-data storage unit, a second relay apparatus from among relay apparatuses identified by second device identification data that is included in any of the received response messages to make a connection with the communication apparatus; and
a radio-wave-intensity detecting unit that detects an intensity of a radio wave at which each response message is received, wherein
the connection requesting unit requests, if the response message including the individual device identification data that matches with the first device identification data stored in the identification-data storage unit is received at an intensity weaker than a first threshold, the second relay apparatus identified by the second device identification data included in any of the received response messages to make the connection with the communication apparatus, and
if the response message including the individual device identification data that matches with the first device identification data stored in the identification-data storage unit is received at an intensity stronger than the first threshold, the connection requesting unit maintains the connection with the first relay apparatus that is connected with the communication apparatus.

8. The communication apparatus according to claim 7, wherein
the transmitting unit transmits the request message including the first network identification data and the first device identification data at a plurality of times, and
the receiving unit receives the response messages each time in response to the request message that has been transmitted several times,
the communication apparatus further comprising a calculating unit that calculates an average of the intensities of the radio waves at which response messages including same individual device identification data are received, wherein
the connection requesting unit requests, if the average of the intensities of the radio waves at which the response messages including the individual device identification data that matches with the first device identification data stored in the identification-data storage unit are received is weaker than the first threshold, the second relay apparatus identified by the second device identification data included in any of the received response messages to make the connection with the communication apparatus.

9. The communication apparatus according to claim 7, wherein, if no received response message includes the individual device identification data that matches with the first device identification data stored in the identification-data storage unit, the connection requesting unit selects a response message that has been received at an intensity stronger than the first threshold from among the received response messages, and requests a relay apparatus that is identified by individual device identification data stored in selected response message to make the connection with the communication apparatus.

10. A communication apparatus capable of connecting to one of a plurality of relay apparatuses that relays wireless communications, the communication apparatus comprising:
an identification-data storage unit that stores therein first device identification data for identifying a first relay apparatus to which the communication apparatus is currently being connected, the first device identification data being unique to the first relay apparatus;
a transmitting unit that transmits a request message that requests connectable relay apparatuses to return a response message;
a receiving unit that receives response messages from the connectable relay apparatuses, each response message including individual device identification data of a relay apparatus that transmitted the request message;
a determining unit that determines whether received response message includes individual device identification data that matches with the first device identification data stored in the identification-data storage unit;
a connection requesting unit that requests, if no received response message includes the individual device identification data that matches with the first device identification data stored in the identification-data storage unit, a second relay apparatus from among relay apparatuses identified by second device identification data that is included in any of the received response messages to make a connection with the communication apparatus;
an intensity/noise detecting unit that detects an intensity of a radio wave at which each response message is received, and an intensity of noise; and
a calculating unit that calculates a signal-to-noise ratio indicative of a ratio of the intensity of the radio wave to the intensity of noise, wherein
the connection requesting unit requests, if the signal-to-noise ratio that is calculated from the intensity of the radio wave at which the response message including the individual device identification data that matches with the first device identification data stored in the identification-data storage unit is received is smaller than a second threshold, the second relay apparatus identified by the second device identification data included in any of the received response messages to make the connection with the communication apparatus, and if the signal-to-noise ratio that is calculated from the intensity of the radio wave at which the response message including the individual device identification data that matches with the first device identification data stored in the identification-data storage unit is received is greater than the second threshold, the connection requesting unit maintains the connection with the first relay apparatus that is connected with the communication apparatus.

11. The communication apparatus according to claim 10, wherein the transmitting unit transmits the request message including the first network identification data and the first device identification data at a plurality of times, and the receiving unit receives the response messages each time in response to the request message that has been transmitted several times, the calculating unit calculates an average of the signal-to-noise ratios of response messages including same individual device identification data, wherein the connection requesting unit requests, if the average of the of the signal-to-noise ratios of the response messages including the individual device identification data that matches with the first device identification data stored in the identification-data storage unit is weaker than a second threshold, the second relay apparatus identified by the second device identification data included in any of the received response messages to make the connection with the communication apparatus.

12. The communication apparatus according to claim 10, wherein, if no received response message includes the individual device identification data that matches with the first device identification data stored in the identification-data storage unit, the connection requesting unit selects a response message for which calculated signal-to-noise ratio is stronger than the second threshold from among the received response messages, and requests a relay apparatus that is identified by individual device identification data stored in selected response message to make the connection with the communication apparatus.

13. A communication apparatus capable of connecting to one of a plurality of relay apparatuses that relays wireless communications, the communication apparatus comprising:

an identification-data storage unit that stores therein first device identification data for identifying a first relay apparatus to which the communication apparatus is currently being connected, the first device identification data being unique to the first relay apparatus;

a transmitting unit that transmits a request message that requests connectable relay apparatuses to return a response message;

a receiving unit that receives response messages from the connectable relay apparatuses, each response message including individual device identification data of a relay apparatus that transmitted the request message;

a determining unit that determines whether received response message includes individual device identification data that matches with the first device identification data stored in the identification-data storage unit;

a connection requesting unit that requests, if no received response message includes the individual device identification data that matches with the first device identification data stored in the identification-data storage unit, a second relay apparatus from among relay apparatuses identified by second device identification data that is included in any of the received response messages to make a connection with the communication apparatus; and a quality detecting unit that detects a signal quality of a radio wave at which each response message is received, wherein the connection requesting unit requests, if the response message including the individual device identification data that matches with the first device identification data stored in the identification-data storage unit is received at a signal quality weaker than a third threshold, the second relay apparatus identified by the second device identification data included in any of the received response messages to make the connection with the communication apparatus, and if the response message including the individual device identification data that matches with the first device identification data stored in the identification-data storage unit is received at a signal quality stronger than the third threshold, the connection requesting unit maintains the connection with the first relay apparatus that is connected with the communication apparatus.

14. The communication apparatus according to claim 13, wherein the transmitting unit transmits the request message including the first network identification data and the first device identification data at a plurality of times, and the receiving unit receives the response messages each time in response to the request message that has been transmitted several times, the communication apparatus further comprising a calculating unit that calculates an average of the signal qualities of the radio waves at which response messages including same individual device identification data are received, wherein the connection requesting unit requests, if the average of the signal qualities of the radio waves at which the response messages including the individual device identification data that matches with the first device identification data stored in the identification-data storage unit are received is weaker than the third threshold, the second relay apparatus identified by the second device identification data included in any of the received response messages to make the connection with the communication apparatus.

15. The communication apparatus according to claim 13, wherein, if no received response message includes the individual device identification data that matches with the first device identification data stored in the identification-data storage unit, the connection requesting unit selects a response message for which calculated signal quality is stronger than the third threshold from among the received response messages, and requests a relay apparatus that is identified by individual device identification data stored in selected response message to make the connection with the communication apparatus.

16. A non-transitory computer-readable storage medium storing computer-readable instructions thereon, which, when executed by a computer, cause the computer to perform a method for a communication apparatus capable of connecting to one of a plurality of relay apparatuses that relays wireless communications, the method comprising:

storing, in the communication apparatus, first device identification data for identifying a first relay apparatus to which the communication apparatus is currently being connected, the first device identification data being unique to the first relay apparatus;

transmitting a request message that requests connectable relay apparatuses to return a response message;

receiving response messages from the connectable relay apparatuses, each response message including individual device identification data of a relay apparatus that transmitted the request message;

determining whether received response message includes individual device identification data that matches with the stored first device identification data;

requesting, if no received response message includes the individual device identification data that matches with the stored first device identification data, a second relay apparatus from among relay apparatuses identified by second device identification data that is included in any of the received response messages to make a connection with the communication apparatus; and if a received response message includes the individual device identification data that matches with the first device identification data stored in the identification-data storage unit, maintaining the connection with the first relay apparatus that is connected with the communication apparatus.

* * * * *